United States Patent
Yamanaka et al.

(10) Patent No.: US 12,158,201 B2
(45) Date of Patent: Dec. 3, 2024

(54) INTERNAL MESHING TYPE GEAR DEVICE

(71) Applicant: SUMITOMO HEAVY INDUSTRIES, LTD., Tokyo (JP)

(72) Inventors: Teijiro Yamanaka, Yokosuka (JP); Akira Yamamoto, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/459,351

(22) Filed: Aug. 31, 2023

(65) Prior Publication Data
US 2024/0084883 A1   Mar. 14, 2024

(30) Foreign Application Priority Data
Sep. 8, 2022   (JP) .................................. 2022-142690

(51) Int. Cl.
*F16H 55/08*   (2006.01)
*F16H 55/17*   (2006.01)

(52) U.S. Cl.
CPC ............. *F16H 55/08* (2013.01); *F16H 55/17* (2013.01)

(58) Field of Classification Search
CPC .... F16H 55/08; F16H 55/17; F16H 2001/325; F16H 1/32
See application file for complete search history.

(56) References Cited

U.S. PATENT DOCUMENTS

| | | | | |
|---|---|---|---|---|
| 2010/0129253 | A1* | 5/2010 | Nunami | F04C 2/102 418/61.3 |
| 2012/0177525 | A1* | 7/2012 | Uozumi | F04C 2/102 418/166 |
| 2018/0172000 | A1* | 6/2018 | Hattori | F04C 2/102 |

FOREIGN PATENT DOCUMENTS

| | | | | |
|---|---|---|---|---|
| JP | 2002147546 | A * | 5/2002 | ............... F16H 1/32 |
| JP | 2018-155263 | A | 10/2018 | |
| WO | WO-2023170934 | A1 * | 9/2003 | ............. F16H 55/30 |

OTHER PUBLICATIONS

Translation of WO-2023170934-A1, Katori et al., Sep. 14, 2023 (Year: 2023).*
Translation of JP-2002147546-A, Umeda et al., May 22, 2002 (Year: 2002).*

* cited by examiner

*Primary Examiner* — Vinh Luong
(74) *Attorney, Agent, or Firm* — HEA LAW PLLC (57) ABSTRACT

An internal meshing type gear device includes: an internal gear; and an external gear that meshes with the internal gear, in which, when a straight line passing through an external gear center and an internal gear center is defined as a gear center line, a pitch point between the external gear and the internal gear is positioned radially inside an external tooth tip circle and an internal tooth tip circle, an intersection point between a normal line to a contact point locus between the external gear and the internal gear and the gear center line is positioned between the pitch point and the external gear center, and the contact point locus is positioned in a meshing region between the external and internal tooth tip circles within an angle range in which an angle centered on the pitch point from the gear center line is 0 to $\pi/2$ [rad].

2 Claims, 7 Drawing Sheets

CO-ROTATING
MESHING

FIG. 5B

COUNTER-ROTATING
MESHING

INTERNAL MESHING TYPE GEAR DEVICE

CROSS-REFERENCE TO RELATED APPLICATIONS

This application claims priority to Japanese Patent Application No. 2022-142690, filed on Sep. 8, 2022, which is incorporated by reference herein in its entirety.

BACKGROUND

Technical Field

A certain embodiment of the present invention relates to an internal meshing type gear device.

Description of Related Art

The related art discloses an internal meshing type gear device including an internal gear and an external gear that meshes with the internal gear.

SUMMARY

A gear device according to an embodiment of the present disclosure is an internal meshing type gear device including: an internal gear; and an external gear that meshes with the internal gear, in which, when a straight line passing through an external gear center $O_1$ of the external gear and an internal gear center $O_2$ of the internal gear as viewed in an axial direction of the internal gear is defined as a gear center line, a pitch point P between the external gear and the internal gear is positioned radially inside an external tooth tip circle of the external gear and an internal tooth tip circle of the internal gear, an intersection point K between a normal line to a contact point locus between the external gear and the internal gear and the gear center line is positioned between the pitch point P and the external gear center $O_1$, and the contact point locus is formed of one or both of a curve and a straight line positioned in a meshing region between the external tooth tip circle and the internal tooth tip circle, and is positioned within an angle range in which an angle θ centered on the pitch point P from the gear center line is 0 to π/2 [rad].

DETAILED DESCRIPTION

In a general gear design method, a tooth profile curve of one gear in a gear pair (an external gear and an internal gear) is first determined, and a tooth profile curve of the other gear is set based on the tooth profile curve. The inventor of the present application has newly found an idea for achieving an increase in efficiency of a gear device and a reduction in abrasion of a gear by an approach different from such a general tooth profile design method.

It is desirable to provide an internal meshing type gear device capable of achieving an increase in efficiency and a reduction in abrasion of a gear.

According to the embodiment of the present disclosure, it is possible to achieve an increase in efficiency of the gear device and a reduction in abrasion of the gear.

Hereinafter, embodiments will be described. Like components are denoted by like reference numerals, and overlapping descriptions will be omitted. In each drawing, for convenience of description, components are omitted as appropriate, enlarged, or reduced. The drawings will be viewed in accordance with directions of reference numerals.

A gear device of the present embodiment will be described from the background which led to the idea of the gear device. As described above, in the general gear design method, a tooth profile curve of one gear of a gear pair is first determined, and then a tooth profile curve of the other gear is set based on the tooth profile curve. However, gear characteristics such as friction loss and abrasion in the gear are greatly affected by a shape of the tooth profile curve. Therefore, when such a general design method is used, since the tooth profile curve of one gear of the gear pair is first determined, the degree of design freedom for these gear characteristics is reduced.

Therefore, in designing a gear pair, the inventor of the present application decided to take an approach of first determining a locus of a contact point of two gears (hereinafter, referred to as a contact point locus) and a pitch point P as conditions for defining gear curves of the two gears, instead of first determining the gear curve of one gear. Accordingly, compared to a general design method in which the tooth profile curve of one gear is first determined, the gear characteristics can be set with a high degree of design freedom without being restricted by the shape of the gear curve of the gear. In addition, in the process of designing a gear pair by this approach, the inventor of the present application newly found conditions suitable for achieving an increase in efficiency of a gear device and a reduction in abrasion of a gear as the conditions such as a contact point locus.

Hereinafter, before describing the characteristics of a gear pair (an external gear and an internal gear), the outline of a gear device in which the gear pair is used will be described. The description will be made with reference to FIGS. 1 and 2. A gear device 10 includes an input shaft 12 to which input rotation is input from a drive source, a gear mechanism 14 that transmits the rotation of the input shaft 12, and an output member 16 that outputs output rotation transmitted from the gear mechanism 14 to a driven device. Specific examples of the drive source are not particularly limited, and examples thereof include a motor, a gear motor, and an engine. A specific example of the driven member is not particularly limited and is, for example, a part of a driven machine such as a conveyor, a vehicle wheel, a machine tool, or a robot (an industrial robot, a service robot, or the like). In addition, the gear device 10 of the present embodiment includes a casing 18 that accommodates the gear mechanism 14, and carriers 20A and 20B that are disposed axially laterally of an external gear 22 included in the gear mechanism 14.

Figure 1:
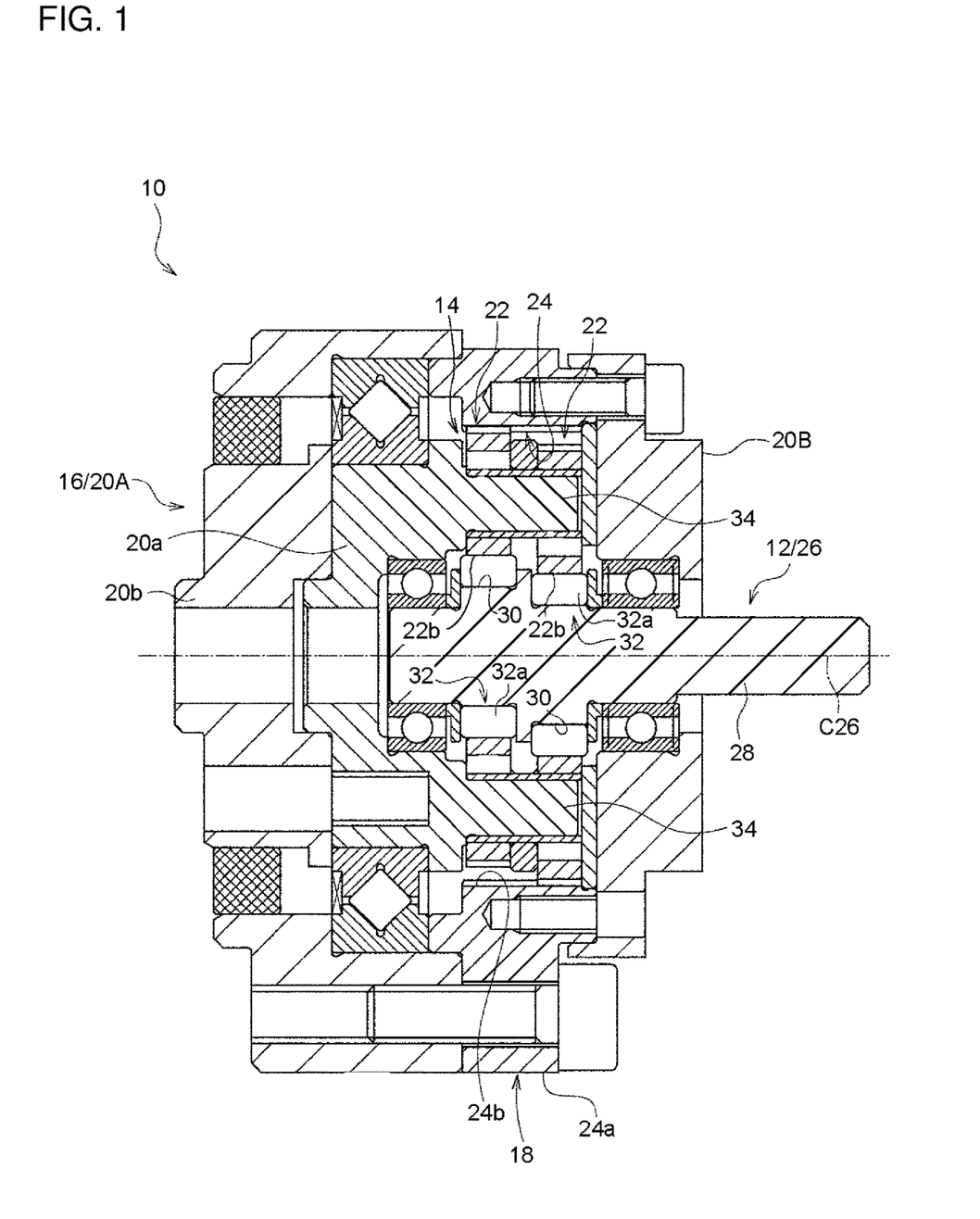
FIG. 1 is a side sectional view of a gear device according to an embodiment.
Figure 2:
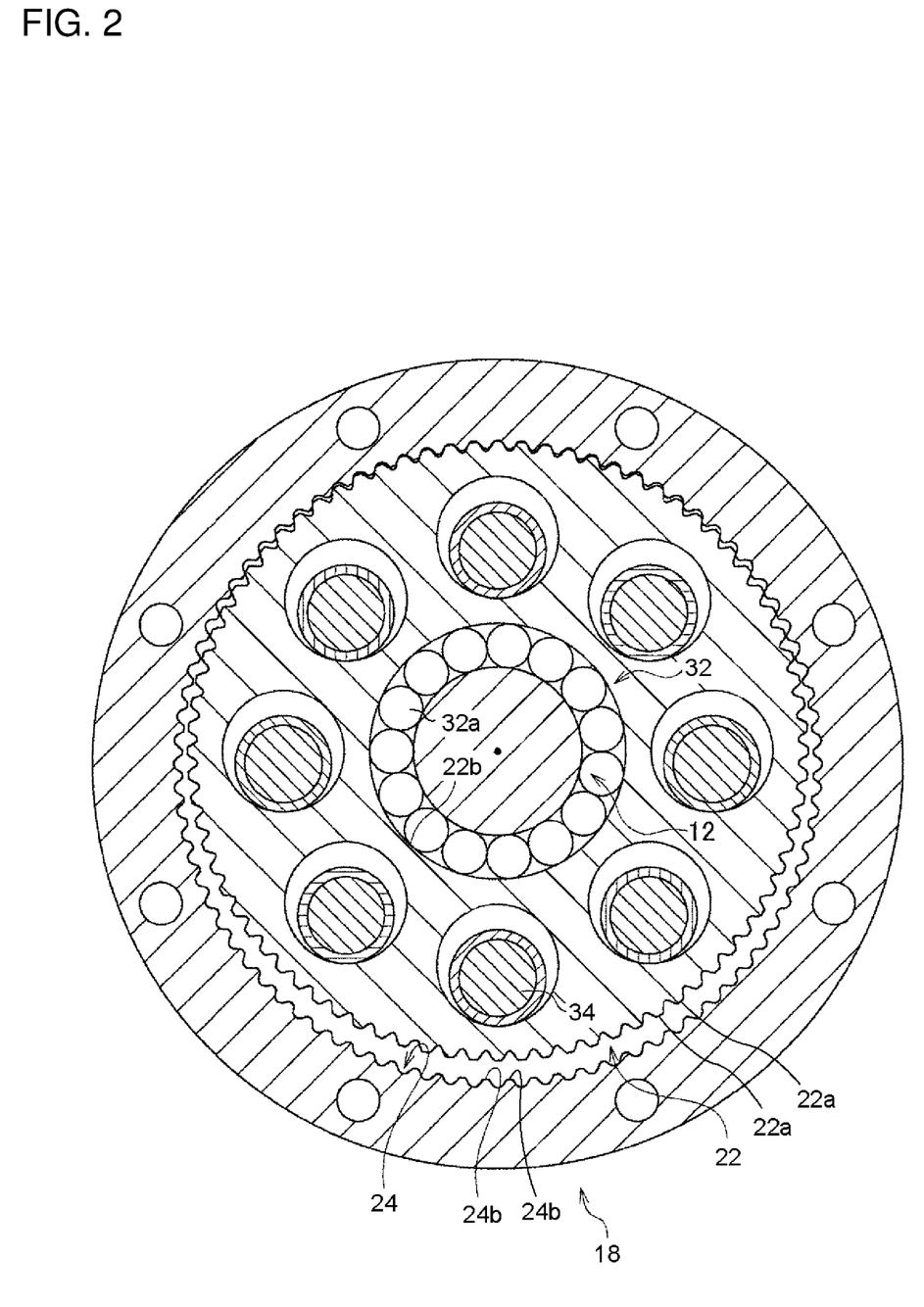
FIG. 2 is a front sectional view of the gear device according to the embodiment.

The gear device 10 of the present embodiment is an eccentric oscillating gear device including the external gear 22 and an internal gear 24 as the gear mechanism 14. In this type of gear device 10, one of the external gear 22 and the internal gear 24 (here, the external gear 22) is oscillated by an eccentric body 30 of a crankshaft 26, so that the output rotation can be transmitted to the output member 16. In the present embodiment, an example in which the carrier 20A serves the output member 16 will be described. However, the casing 18 may serve as the output member 16.

The input shaft 12 of the present embodiment is the crankshaft 26. The crankshaft 26 includes a shaft body 28 and at least one (here, two) eccentric body 30 that can rotate integrally with the shaft body 28. The eccentric body is eccentric with respect to a center of rotation C26 of the crankshaft 26. The shaft body 28 and the eccentric body may be separate bodies or may be provided as a part of the same member.

The external gear 22 is supported via a bearing 32 to be rotatable relative to the input shaft 12. The external gear 22 includes a plurality of external teeth 22a provided on an outer peripheral portion of the external gear 22, and a through-hole 22b through which the input shaft 12 passes. The internal gear 24 includes an internal gear main body 24a integrated with the casing 18 that accommodates the external gear 22, and a plurality of internal teeth 24b provided on an inner peripheral portion of the internal gear main body 24a. The internal teeth 24b of the present embodiment are formed directly on an inner peripheral surface of the internal gear main body 24a.

The carriers 20A and 20B of the present embodiment are individually disposed on both sides of the external gear 22 in an axial direction. The carriers 20A and 20B include a first carrier 20A disposed on a counter input side and a second carrier 20B disposed on an input side. In the present embodiment, the first carrier 20A is configured by integrating a first carrier member 20a disposed on the input side and a second carrier member 20b disposed on the counter input side. The carriers 20A and 20B can be synchronized with an axial rotation component of the external gear 22 when the external gear 22 is oscillated by inner pins 34 penetrating the external gear 22.

The bearing 32 that supports the external gear 22 includes a plurality of rolling elements 32a. The bearing 32 of the present embodiment does not include a dedicated outer ring, an inner peripheral surface of the through-hole 22b of the external gear 22 also serves as the outer ring, and an outer rolling contact surface is provided on the inner peripheral surface thereof. The bearing 32 of the present embodiment does not include a dedicated inner ring, an outer peripheral surface of the input shaft 12 (here, an outer peripheral surface of the eccentric body 30) also serves as the inner ring, and an inner rolling contact surface is provided on the outer peripheral surface thereof.

Alternatively, the bearing 32 may include a dedicated outer ring and a dedicated inner ring, and an outer rolling contact surface and an inner rolling contact surface may be provided thereon.

An operation of the above-described gear device will be described. When the input shaft 12 (here, the crankshaft 26) rotates, the external gear 22 is oscillated by the eccentric body 30 of the crankshaft 26. When the external gear 22 is oscillated, meshing positions of the external gear 22 and the internal gear 24 sequentially change in a circumferential direction. As a result, each time the crankshaft 26 makes one rotation, one of the external gear 22 and the internal gear 24 (here, the external gear 22) rotates by a difference in the number of teeth between the two. This axial rotation component is transmitted to the output member (here, the carrier 20A via the inner pin 34), and is then output to the driven member as the output rotation.

As described above, the gear device 10 of the embodiment is an internal meshing type gear device including, as a gear pair, the internal gear 24 and the external gear 22 that mesh with the internal gear 24. Details of the characteristics of this gear pair will be described.

Figure 3:
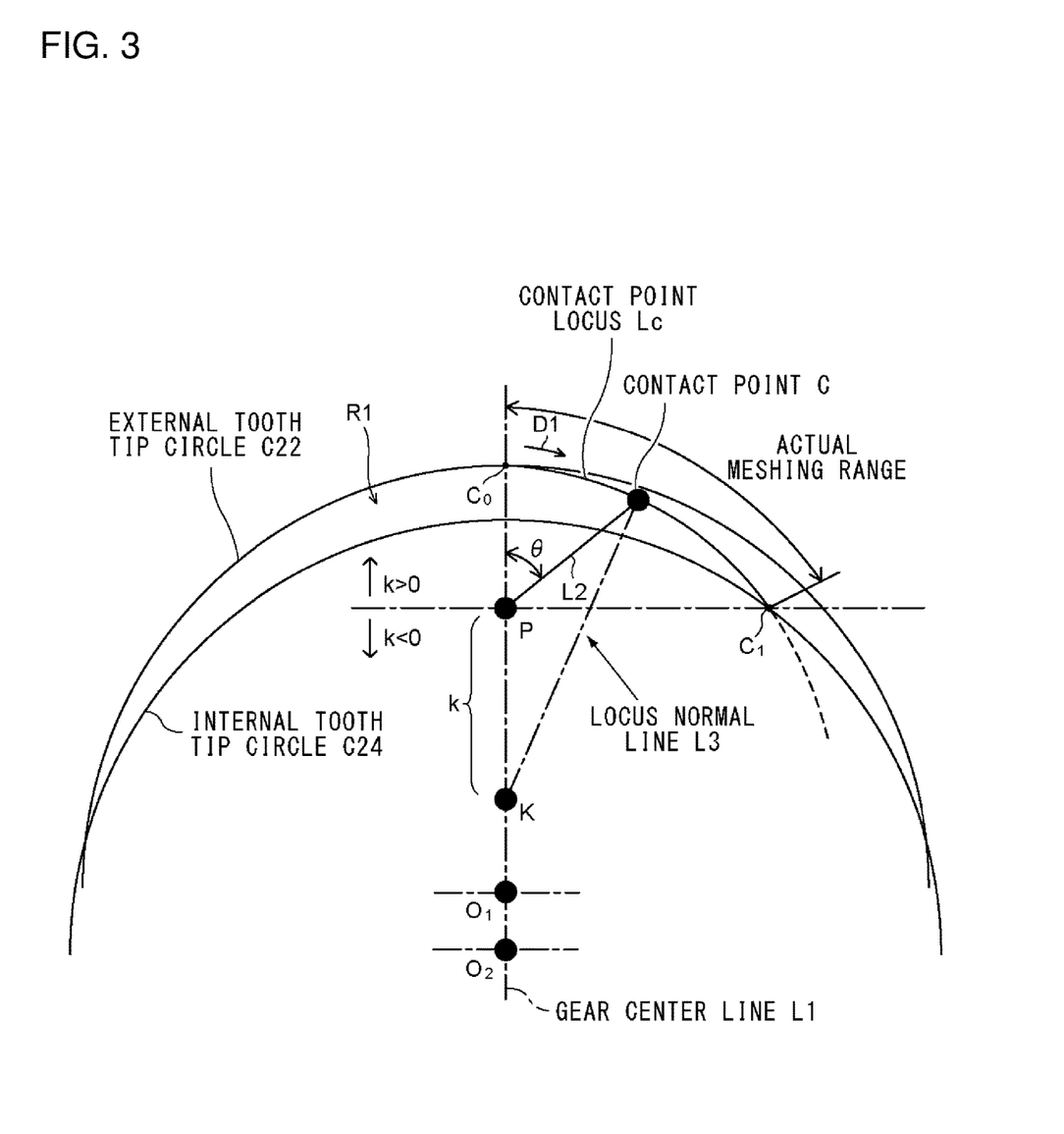
FIG. 3 is an explanatory view of a contact point locus.

The description will be made with reference to FIG. 3. Hereinafter, a radial direction with an internal gear center $O_2$ of the internal gear 24 as a center of a circle is simply referred to as a "radial direction". In addition, a straight line passing through an external gear center $O_1$ of the external gear 22 and the internal gear center $O_2$ of the internal gear 24 when viewed in an axial direction of the internal gear 24 is referred to as a gear center line L1. In addition, an orthogonal coordinate system fixed with respect to the gear center line L1 is referred to as a reference coordinate system. An origin of the reference coordinate system is the gear center of any of the gears, and one coordinate axis (y-axis) thereof is the gear center line L1. The reference coordinate system in FIG. 3 is a stationary coordinate system that remains stationary even when meshing between the external gear 22 and the internal gear 24 progresses.

A tooth tip circle of the external gear 22 is referred to as an external tooth tip circle C22, and a tooth tip circle of the internal gear 24 is referred to as an internal tooth tip circle C24. The external tooth tip circle C22 refers to a circle in which tip ends of the plurality of external teeth 22a in the external gear 22 are connected, and the internal tooth tip circle C24 refers to a circle in which tip ends of the plurality of internal teeth 24b in the internal gear 24 are connected. Each of the external tooth tip circle C22 and the internal tooth tip circle C24 of the present embodiment has a circular shape.

A region surrounded by the external tooth tip circle C22 and the internal tooth tip circle C24 is referred to as a meshing region R1. The meshing region R1 is formed radially inside the external tooth tip circle C22 and radially outside the internal tooth tip circle C24. The meshing between the external gear 22 and the internal gear 24 is performed within the meshing region R1. A contact position between a tooth profile curve of the external gear 22 and a tooth profile curve of the internal gear 24 that mesh with each other is referred to as a contact point C. The contact point C moves in a direction D1 (here, clockwise) as the meshing between the external gear 22 and the internal gear 24 progresses in the reference coordinate system. A locus drawn by the contact point C that moves with the progress of meshing in the reference coordinate system is referred to as a contact point locus Lc. A certain range of the contact point locus Lc in the meshing region R1 is an actual meshing range.

A pitch point P between the external gear 22 and the internal gear 24 is an intersection point between a common normal line L2 to the two tooth profile curves and the gear center line L1 at the contact point C. The pitch point P is a momentary center of relative motion between the external teeth of the external gear 22 and the internal teeth of the internal gear 24 that mesh with each other. In the case of an eccentric oscillating gear device and a simple planetary gear device, the pitch point P is a fixed point that does not move in the progress of meshing between the external gear 22 and the internal gear 24 in the reference coordinate system.

An intersection point between a normal line L3 (hereinafter, referred to as a locus normal line L3) to the contact point locus Lc at the contact point C and the gear center line L1 is referred to as an intersection point K, and a length from the intersection point K to the pitch point P is referred to as k. The locus normal line L3 is a straight line perpendicular to a tangent line to the contact point locus Lc at the contact point C. As shown in FIG. 3, a sign of k is set to be positive when the intersection point K is present on a side opposite to the internal gear center $O_2$ with respect to the pitch point P, and is set to be negative when the intersection point K is present on an internal gear center $O_2$ side from the pitch point P.

In the reference coordinate system, an angle θ from the gear center line L1 centered on the pitch point P is referred to as an angle θ. The angle θ is positive on a side where the contact point C moves away from the gear center line L1 in a movement direction D1.

At this time, the gear device 10 of the present embodiment is subjected to three conditions described below, which are satisfied by the external gear 22 and the internal gear 24. The first condition is that the pitch point P is positioned radially inside each of the tooth tip circles C22 and C24. The second condition is that the intersection point K is positioned between the pitch point P and the external gear center $O_1$. This second condition needs to be satisfied in the entire range of the process in which the contact point C moves along the contact point locus Lc in the meshing region R1. The third condition is that the contact point locus Lc is present within an angle range in which the angle θ is 0 to π/2 [rad] in the meshing region R1. The third condition can be said to be a condition in which the contact point locus Lc does not protrude outside the angle range (the angle range in which θ is less than 0 and exceeds π/2) in which the angle θ is 0 to π/2 in the meshing region R1. In FIG. 3, an example is shown in which the contact point locus Lc is present within an angle range from a position $C_0$ where the angle θ is 0 to a position $C_1$ where the angle θ is π/2 (that is, the entire angle range where the angle θ is 0 to π/2). Hereinafter, the reasons for setting these conditions will be described.

Figure 4:
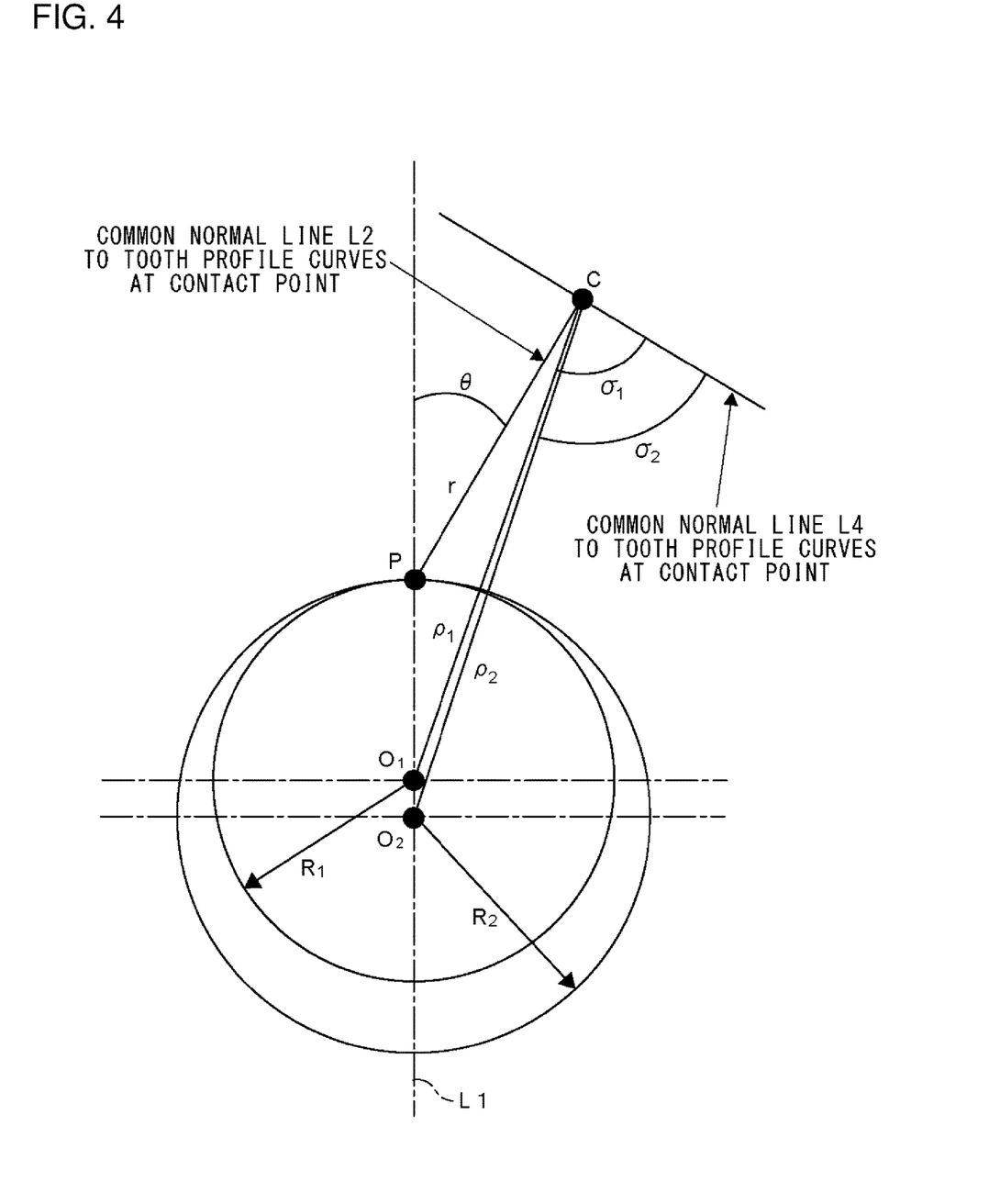
FIG. 4 is an explanatory view of a meshing equation.

The description will be made with reference to FIG. 4. Hereinafter, subscript 1 of each symbol means a content regarding the external gear 22, and subscript 2 means a content regarding the internal gear 24. An expression of the contact point C on the contact point locus Lc using tangential coordinates with the gear center $O_i$ (i=1, 2) of each of the external gear 22 and the internal gear 24 as a pole is examined. The tangential coordinates include a radius $\rho_i$ that is a length of a half-line $O_iC$ from the gear center $O_i$ to the contact point C and a tangential angle of that is an angle of a tangent line to the tooth profile curve (which is also a common tangent line L4 to the two tooth profile curves) from the half-line $O_iC$ at the contact point C. That is, the contact point C can be defined by $(\rho_1, \sigma_i)$ in a case where the tangential coordinates with the gear center $O_1$ of the external gear 22 as the pole are used, and can be defined by $(\rho_2, \sigma_2)$ in a case where the tangential coordinates with the gear center $O_2$ of the internal gear 24 as the pole are used.

Next, an expression of the contact point C on the contact point locus Lc using polar coordinates with the pitch point P as a pole will be examined. The polar coordinates include a radius r which is a length of a half-line PC from the pitch point P to the contact point C and a polar angle θ which is an angle of the half-line PC from the gear center line L1. That is, the contact point C can be defined by (r, θ) in a case where the polar coordinates with the pitch point P as the pole are used. The half-line PC is also the common normal line L2 to the two tooth profile curves at the contact point C. The angle θ is itself used under the third condition described above. The angle θ can be said to be an angle formed by the common normal line L2 to the two tooth profile curves at the contact point C with respect to the gear center line L1 centered on the pitch point P.

It is known that a meshing equation regarding an internally meshing gear pair can be described by Equation (1) below. In this equation, the tooth profile curves of the gear pair are represented by the tangential coordinates (ρ, σ) on a left side, and the contact point locus Lc is represented by the polar coordinates (θ) on a right side. R is a pitch circle radius of each of the gears 22 and 24.

$$\left.\begin{array}{l}\rho_1 \cdot \cos\sigma_1 = R_1 \cdot \sin\theta \\ \rho_1 \cdot \sin\sigma_1 = R_1 \cdot \cos\theta + r \\ \rho_2 \cdot \cos\sigma_2 = R_2 \cdot \sin\theta \\ \rho_2 \cdot \sin\sigma_2 = R_2 \cdot \cos\theta + r\end{array}\right\} \quad (1)$$

A relative radius of curvature $\rho_{rc}$ between infinitesimal line elements on the tooth profile curves of the gear pair at the contact point C is examined. A radius of curvature $\rho_{c1}$ of the infinitesimal line element on the tooth profile curve of the external gear 22 can be represented by Equation (2) below.

$$\rho_{C1} = \frac{r^2 \cdot (k + R_1)}{(k + R_1) \cdot r - R_1 \cdot k \cdot \cos\theta} \quad (2)$$

Here, a length k of Equation (2) can be represented by Equation (3) below. In Equation (3), dr and d(r·cos θ) are infinitesimal changes in r and (r·cos θ) when there is a displacement from the point C to a point C' on the tooth profile curve by the infinitesimal line element.

$$k = \frac{rdr}{d(r \cdot \cos\theta)} \quad (3)$$

Similarly to this, a radius of curvature $\rho_{c2}$ of the infinitesimal line element on the tooth profile curve of the internal gear 24 can be represented by Equation (4) below.

$$\rho_{C2} = \frac{r^2 \cdot (k + R_2)}{(k + R_2) \cdot r - R_2 \cdot k \cdot \cos\theta} \quad (4)$$

The relative radius of curvature $\rho_{rc}$ can be obtained by Equation (5) below from Equations (2) and (4).

$$\rho_{rc} = \frac{\rho_{C1} \cdot \rho_{C2}}{\rho_{C2} - \rho_{C1}} = \frac{r^2 \cdot (k + R_1) \cdot (k + R_2)}{(R_2 - R_1) \cdot k^2 \cdot \cos\theta} \quad (5)$$

It is known that as the relative radius of curvature $\rho_{rc}$ increases, a contact stress at the contact point C between the external gear 22 and the internal gear 24 can be reduced, and a lubricating oil film thickness can be increased. This allows the oil film thickness to be increased without reducing a load capacity of the gear pair, and thus contributes to an increase in efficiency and a reduction in abrasion due to reduced friction loss in gear pairs having the same load capacity. The radius of curvature $\rho_{c1}$ of the external gear 22 is positive in a case where the tooth profile curve of the external gear 22 is a convex curved surface and negative in a case where the tooth profile curve of the external gear 22 is a concave curved surface. In addition, the radius of curvature $\rho_{c2}$ of the internal gear 24 is positive in a case where the tooth profile curve of the internal gear 24 is a concave curved surface and negative in a case where the tooth profile curve of the internal gear 24 is a convex curved surface.

Next, a type 1 interference will be examined using the relative radius of curvature $\rho_{rc}$. The type 1 interference means that substantial sides (substantial portion) of the external gear 22 and the internal gear 24 overlap with each other as the meshing between the external gear 22 and the internal gear 24 progresses. This type 1 interference is known to occur in a case of concave-convex meshing, which will be described later, and in a case where the radius of curvature of one tooth profile curve approaches the radius of curvature of the other tooth profile curve as the meshing progresses, and thereafter, magnitudes of the radii of curvature are reversed. In terms of a relationship with the relative radius of curvature $\rho_{rc}$ of Equation (5), the type 1 interference occurs in a case where a sign of the relative radius of curvature $\rho_{rc}$ changes with the progress of meshing. According to Equation (5), in order to prevent the type 1 interference from occurring, "$(k+R_1)\cdot(k+R_2)$" and "$\cos\theta$" always need to have the same sign or different signs over a change in $\theta$.

Here, the present embodiment is subjected to the condition in which the intersection point K is positioned between the pitch point P and the external gear center $O_1$ (second condition). This means that $(k+R_1)\cdot(k+R_2)$ in Equation (5) are always positive. Furthermore, the present embodiment is subjected to the condition in which the contact point locus Lc is present within the angle range in which the angle $\theta$ is 0 to $\pi/2$ (third condition). This means that case in Equation (5) is always positive. Therefore, according to the present embodiment, meshing between the external gear 22 and the internal gear 24 can be realized without causing the type 1 interference.

Next, a specific sliding $\Sigma$ at the contact point C between the external gear 22 and the internal gear 24 will be examined. When the infinitesimal line elements on the tooth profile curves of the external gear 22 and the internal gear 24 at the contact point C are indicated as $ds_1$ and $ds_2$, it is known that the infinitesimal line elements $ds_1$ and $ds_2$ are represented by Equations (6) and (7) below.

$$ds_1 = \frac{d\rho_1}{\cos\sigma_1} \quad (6)$$

$$ds_2 = \frac{d\rho_2}{\cos\sigma_2} \quad (7)$$

A specific sliding $\Sigma_1$ of the external gear 22 can be represented by Equation (8) below.

$$\Sigma_1 = \frac{ds_1 - ds_2}{ds_1} \quad (8)$$

Equation (9) below can be derived from Equation (8) by using Equations (1), (3), (6), and (7). From Equation (9), the specific sliding $\Sigma_1$ of the external gear 22 can be obtained.

$$\Sigma_1 = \frac{\frac{1}{R_1} - \frac{1}{R_2}}{\frac{1}{R_1} + \frac{1}{k}} \quad (9)$$

Similarly, a specific sliding $\Sigma_2$ of the internal gear 24 can be represented by Equation (10) below.

$$\Sigma_2 = \frac{ds_2 - ds_1}{ds_2} = \frac{\frac{1}{R_2} - \frac{1}{R_1}}{\frac{1}{R_2} + \frac{1}{k}} \quad (10)$$

Figure 5A:
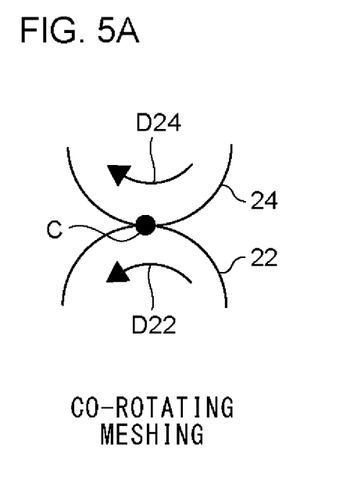
FIG. 5A is an explanatory view of co-rotating meshing.
Figure 5B:
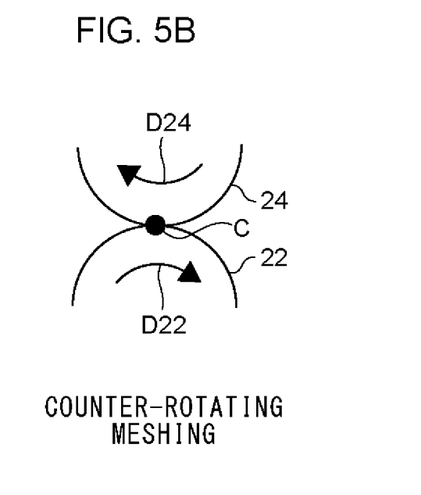
FIG. 5B is an explanatory view of counter-rotating meshing.

The description will be made with reference to FIGS. 5A and 5B. Two types of meshing of two gears are known: co-rotating meshing and counter-rotating meshing. The co-rotating meshing means meshing in which, at the contact point C of the two gears, respective movement directions D22 and D24 of the gears 22 and 24 are the same, and the counter-rotating meshing means meshing in which the movement directions D22 and D24 are opposite to each other. It is known that the co-rotating meshing and the counter-rotating meshing can be represented as follows by using a product of the specific sliding $\Sigma_1$ of the external gear 22 and the specific sliding $\Sigma_2$ of the internal gear 24.

Figure 6:
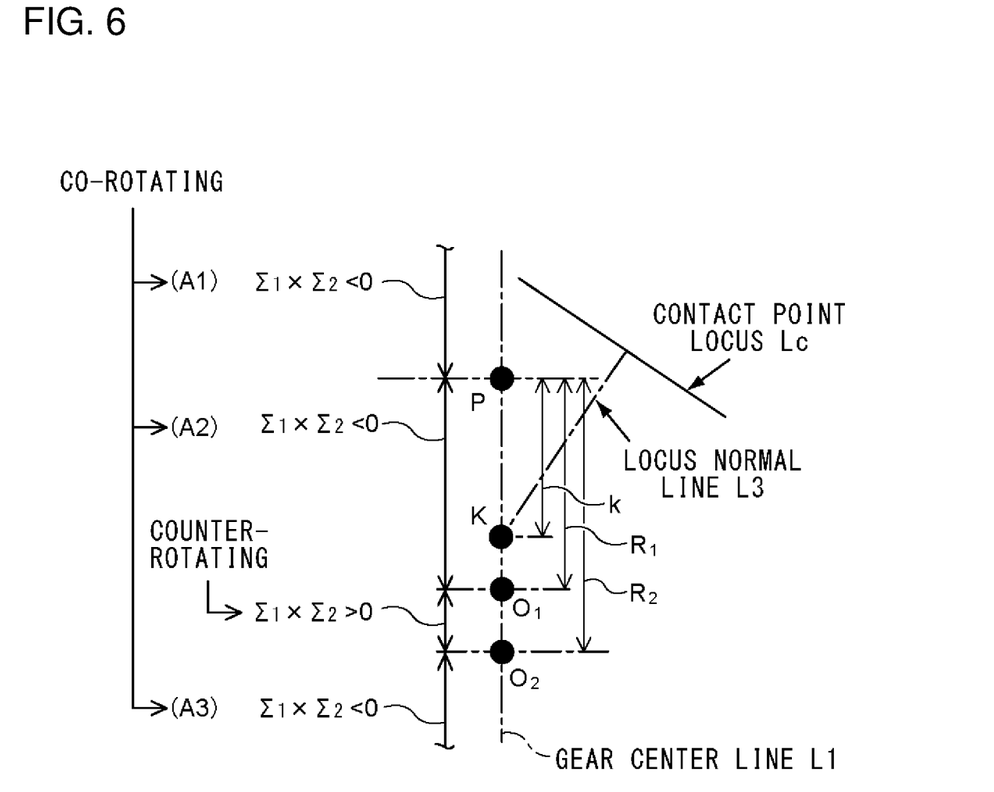
FIG. 6 is a diagram showing a position of an intersection point K for realizing the co-rotating meshing.

$\Sigma_1 \times \Sigma_2 < 0$:      Co-rotating meshing $\Sigma_1 \times \Sigma_2 > 0$:      Counter-rotating meshing According to Equations (9) and (10), it can be seen that the position of the intersection point K that satisfies conditions of the co-rotating meshing is either (A1) $k>0$, (A2) $k<0$ and $k^2<R_1^2$, or (A3) $k<0$ and $R_2^2<k^2$. In a case where the position of the intersection point K does not satisfy any of these conditions, the meshing type of the external gear 22 and the internal gear 24 is the counter-rotating meshing. The position of the intersection point K satisfying these conditions is as shown in FIG. 6. In a case of an internally meshing type gear pair, a relationship between pitch circle radii of the external gear 22 and the internal gear 24 is $R_1<R_2$.

It is known that co-rotating meshing is more advantageous than counter-rotating meshing in terms of forming an oil film at the contact point C of two gears to achieve a reduction in abrasion. The present embodiment is subjected to the condition in which the intersection point K is positioned between the pitch point P and the external gear center $O_1$ (second condition). This means that the condition (A2) is satisfied in terms of a relationship with the conditions of the co-rotating meshing. Accordingly, a reduction in abrasion can be achieved by realizing the co-rotating meshing.

In a case where the pitch point P is present inside each of the tooth tip circles C22 and C24 as in the first condition, geometrically, it is easier to lengthen the contact point locus in the meshing region $R_1$ in a case where the position of the intersection point K satisfies $k<0$ than in a case where the position of the intersection point K satisfies $k>0$. In other words, by adopting the condition (A2) in which the position of the intersection point K satisfies $k<0$, it is easy to lengthen the contact point locus in the meshing region $R_1$ compared to the condition (A1) in which the position of the intersection point K satisfies $k>0$. This means that the number of meshing teeth that can be meshed at the same time in the meshing region $R_1$ can be increased, and contributes to a reduction in a load applied to one tooth, that is, a reduction in abrasion. In addition, by adopting the condition (A2), a k value can be reduced compared to the condition (A3). This means that the relative radius of curvature $\rho_{rc}$ can be increased, as can be identified from Equation (5), and contributes to a reduction in the contact stress and an increase in the lubricating oil film thickness. In particular, an increase in the lubricating oil film thickness contributes to an increase in efficiency and a reduction in abrasion.

Next, conditions for realizing concave-convex meshing between the external gear 22 and the internal gear 24 will be examined. It is known that in a case where the external gear 22 and the internal gear 24 are subjected to concave-convex meshing, the contact stress can be reduced by increasing the relative radius of curvature compared to that in convex-convex meshing. Here, the concave-convex meshing refers to meshing between a convex curved surface and a concave curved surface, and the convex-convex meshing refers to meshing between a convex curved surface and a convex curved surface. In order to realize the concave-convex meshing, the radii of curvature of the two tooth profile curves at the contact point C need to have the same sign. Here, the same sign refers to two types: a case where the radii of curvature of both the two tooth profile curves are positive (in a case where the external gear 22 has a convex curved surface and the internal gear 24 has a concave curved surface) and a case where the radii of curvature of both the two tooth profile curves are negative (in a case where the external gear 22 has a concave curved surface and the internal gear 24 has a convex curved surface).

The conditions for realizing the concave-convex meshing can be specified by using Equations (2) and (4). A case where the radii of curvature of both the two tooth profile curves are positive means a case where a left side $\rho_{c1}$ of Equation (2) and a left side $\rho_{c2}$ of Equation (4) are positive. In the present embodiment, since the second condition (the intersection point K is positioned in $PO_1$) is satisfied, both "k+$R_1$" in a numerator on a right side of Equation (2) and "k+$R_2$" in a numerator on a right side of Equation (4) are positive. In a case where the left side $\rho_{c1}$ of Equation (2) is positive and "k+$R_1$" in the numerator on the right side is positive, a denominator on the right side needs to be positive. Similarly, in a case where the left side $\rho_{c2}$ of Equation (4) is positive and "k+$R_2$" in the numerator on the right side is positive, a denominator on the right side needs to be positive. That is, in a case where the radii of curvature of both the two tooth profile curves are positive, the case means that the concave-convex meshing can be realized when the denominators of the right sides of both of Equations (2) and (4) are positive. The same applies to a case where the radii of curvature of both the two tooth profile curves are negative. The case where the radii of curvature of both the two tooth profile curves are negative means a case where the left side $\rho_{c1}$ of Equation (2) and the left side $\rho_{c2}$ of Equation (4) are negative. Therefore, from the same idea as described above, in the case where the radii of curvature of both the two tooth profile curves are negative, the case means that the concave-convex meshing can be realized when the denominators of the right sides of both of Equations (2) and (4) are negative.

Here, the present embodiment is subjected to the condition in which the intersection point K is positioned between the pitch point P and the external gear center $O_1$ (second condition). This means that the conditions of k+$R_1$>0 and k+$R_2$>0 are satisfied. In addition, this means that k is always negative as shown in FIG. 3.

In a case where the radii of curvature of both the two tooth profile curves are positive, when the angle θ is π/2 to n, the denominators on the right sides of Equations (2) and (4) have a negative sign depending on the position of the intersection point K, and the concave-convex meshing may not be realized. In addition, in a case where the radii of curvature of both the two tooth profile curves are negative, and in a case where the angle θ is 0 to π/2, the denominators on the right sides of Equations (2) and (4) have a positive sign, so that the concave-convex meshing cannot be realized. In addition, in a case where the radii of curvature of both the two tooth profile curves are negative, and in a case where the angle θ is π/2 to n, the denominators on the right sides of Equations (2) and (4) have a positive sign depending on the position of the intersection point K, so that the concave-convex meshing may not be realized.

Contrary to this, in a case where the radii of curvature of both the two tooth profile curves are positive, when the angle θ is in the range of 0 to π/2 (that is, in the case where the third condition is satisfied), the sign of the denominators of Equations (2) and (4) are positive regardless of the magnitude of k. That is, in this case, as long as the position of the intersection point K satisfies the second condition, the concave-convex meshing can be realized regardless of the position of the intersection point K.

The above is summarized. By satisfying the second condition (the intersection point K is positioned in $PO_1$) and the third condition (the contact point locus Lc is present within an angle range where θ is 0 to π/2), the meshing between the external gear 22 and the internal gear 24 can be realized without causing the type 1 interference. In addition, by satisfying the second condition, a reduction in abrasion of the gear can be achieved by realizing the co-rotating meshing. At this time, by satisfying the first condition (the pitch point P is present inside each of the tooth tip circles C22 and C24), the contact point locus is lengthened, so that a reduction in contact stress and a reduction in abrasion can be achieved. In addition, by satisfying the second condition and the third condition, it is possible to achieve a reduction in abrasion and an increase in efficiency of the gear by realizing the concave-convex meshing regardless of the position of the intersection point K. With the above characteristics, it is possible to achieve a reduction in friction loss of the gear as well as a reduction in abrasion of the gear, so that an increase in efficiency of the gear device 10 can be achieved.

A case where the second condition is not satisfied is examined. For example, in a case where the intersection point K is present on the side opposite to the internal gear center $O_2$ with respect to the pitch point P, the contact point locus Lc in the meshing region $R_1$ is shortened as described above, resulting in an increase in contact stress and abrasion. In addition, in a case where the intersection point K is present between the external gear center $O_1$ and the internal gear center $O_2$, the counter-rotating meshing occurs, so that a reduction in abrasion of the gear cannot be realized. In addition, in a case where the intersection point K is present on the side opposite to the pitch point P with respect to the internal gear center $O_2$, an increase in the k value causes a decrease in the relative radius of curvature and an increase in the specific sliding, resulting in an increase in contact stress, abrasion, and friction loss.

A case where the third condition is not satisfied is examined. When the contact point locus Lc protrudes into an angle range where the angle θ is less than 0 or an angle range where the angle θ exceeds π/2, the sign of case changes with a change in θ from Equation (5), and the type 1 interference occurs or the counter-rotating meshing occurs.

The contact point locus Lc described above is formed of one or both of a curve and a straight line positioned in the meshing region $R_1$. The contact point locus Lc may be formed of only one of a curve and a straight line, or may be formed by combining a curve and a straight line. In a case where the contact point locus Lc is formed by combining a curve and a straight line, the number of at least one of the curve and the straight line forming the contact point locus Lc may be more than one. In a case where the contact point locus Lc includes a curve, a plurality of curves having different curvatures may be included. The "curve" and "straight line" herein are not limited to a geometrically exact curve and a straight line, and may include a substantially curved line and a substantially straight line. It is preferable that the contact point locus Lc is formed of a curve having a center of curvature inside the internal tooth tip circle C24 as in the present embodiment. Accordingly, compared to a case where the contact point locus Lc is a straight line or a case where the contact point locus Lc is formed of a curve having a center of curvature outside the external tooth tip circle C22, a meshing range in the meshing region $R_1$ can be increased. This means that the number of meshing teeth can be increased as described above, and contributes to a reduction in contact stress and abrasion. In particular, in a case where the external gear 22 and the internal gear 24 in an internal meshing type using an involute tooth profile are used, the contact point locus becomes a straight line. Therefore, it is advantageous in that the number of meshing teeth can be increased compared to the involute tooth profile.

Figure 7:
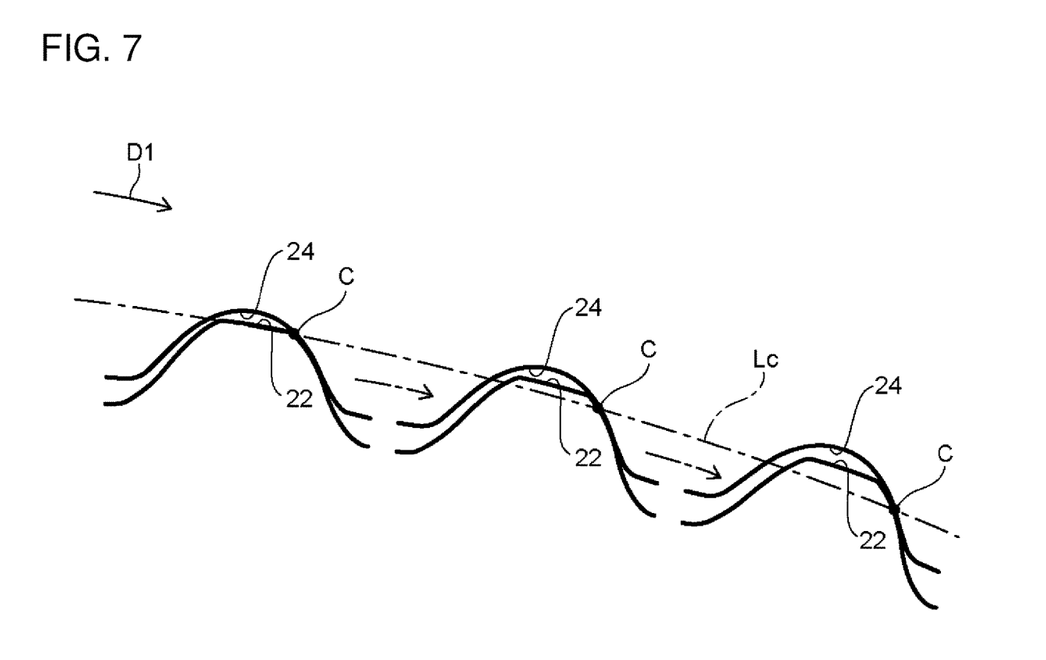
FIG. 7 is a diagram showing a movement locus of meshing portions between an external gear and an internal gear.

The description will be made with reference to FIG. 7. FIG. 7 is a diagram showing a movement locus during an operation of meshing portions of the external gear 22 and the internal gear 24 in the reference coordinate system. In the meshing portions of the external gear 22 and the internal gear 24, a tooth surface (tooth profile curve) of the external gear 22 has a convex curved surface, and a tooth surface (tooth profile curve) of the internal gear 24 has a concave curved surface. Accordingly, the above-described concave-convex meshing can be realized, and a reduction in abrasion of the gear can be achieved.

A definition of the external gear center $O_1$ will be described. In a cross section perpendicular to the axial direction of the internal gear 24, in a case where there is no bearing inside the external gear 22 and there is a rotary shaft that rotates integrally with the external gear 22, a center of rotation of the rotary shaft is defined as the external gear center $O_1$. This assumes, for example, a case where a planetary gear of a simple planetary gear mechanism is the external gear 22. In addition, in the cross section perpendicular to the axial direction of the internal gear 24, in a case where there is only a single bearing 32 inside the external gear 22, a center of curvature of an outer shape of the bearing 32 is defined as the external gear center $O_1$. This assumes, for example, as well as a case where the gear device 10 is a center crank type eccentric oscillating gear device as in the present embodiment, a case where the gear device 10 is a bending meshing type gear device or the like. In addition, in the cross section perpendicular to the axial direction of the internal gear 24, in a case where there are a plurality of bearings inside the external gear 22, a center of a circle passing through centers of curvature of respective outer shapes of the plurality of bearings is defined as the external gear center $O_1$. This assumes, For example, a case where the gear device 10 is a distributed eccentric oscillating gear device.

Here, the "center of curvature of the outer shape of the bearing" means a center of curvature of an outer shape formed by an inner rolling contact surface of the bearing. The inner rolling contact surface of the bearing is a surface on which rolling elements, which are present radially outside the rolling elements, roll. In a case where the bearing has a dedicated outer ring, the inner rolling contact surface is provided on an inner peripheral surface of the dedicated outer ring. In addition, in a case where the bearing does not have a dedicated outer ring and the inner peripheral surface of the external gear also serves as the outer ring, the inner rolling contact surface is provided on the inner peripheral surface of the external gear.

Handling in a case of a bending meshing type gear device will be described. The bending meshing type gear device includes a wave generator and a flexible gear (flex spline) that undergoes flexible deformation into an elliptical shape by the wave generator. Here, a case where the flexible gear is the external gear 22 will be described. In the case of the bending meshing type gear device, the external gear center $O_1$ of the external gear 22 is momentary center of relative motion between one external tooth of the external gear 22 and the wave generator that mesh with each other at the moment when the external gear 22 and the internal gear 24 mesh with each other. In this case, it is known that the external gear center $O_1$ is different for each external tooth of interest (for each external tooth meshing with the internal gear 24). The external gear center $O_1$ coincides with, at an intersection point between a gear center line of the external tooth meshing with the internal gear 24 and a curve formed by the inner rolling contact surface of the bearing, a center of curvature of the curve. The external gear center $O_1$ is present in an angle range of 90° from a major axis to a minor axis of the elliptical shape formed by the external gear 22 on the premise that the external gear center $O_1$ does not overlap with the internal gear center $O_2$.

In the case of the bending meshing type gear device, it is known that similarly to the external gear center $O_1$, the reference coordinate system determined by the gear center line L1 passing through the external gear center $O_1$ and the internal gear center $O_2$ is also different for each external tooth of interest. In this case, it is known that similarly to the external gear center $O_1$, the pitch point P and the intersection point K are also different for each external tooth of interest. In this case, an intersection point between the common normal line L2 to the tooth profile curves at the contact point C between the external tooth and the internal tooth of interest and the gear center line L1 corresponding to the external tooth is the pitch point P corresponding to the external tooth. In addition, in this case, an intersection point between the locus normal line L3 at the contact point C between the external tooth and the internal tooth of interest and the gear center line L1 corresponding to the external tooth is the intersection point K corresponding to the external tooth. In this case, the external gear center $O_1$ and the pitch point P corresponding to the common external tooth slightly move with respect to the internal gear center O 2 in the progress of meshing, but are present on the gear center line L1 corresponding to the external tooth. The internal gear center $O_2$ is a fixed point fixed to the internal gear 24 regardless of the external tooth of interest.

As described above, in the case of the bending meshing type gear device, the reference coordinate system corresponding to each external tooth is different. Therefore, in this case, the above-described first to third conditions regarding the pitch point P and the intersection point K derived from the contact point C between a certain external tooth and an internal tooth may be satisfied in a relationship with the reference coordinate system corresponding to the external tooth.

A cross-sectional shape of the wave generator used in the bending meshing type gear device perpendicular to the axial direction has an elliptical shape. This elliptical shape is not limited to a geometrically exact elliptical shape, and includes a substantially elliptical shape. For example, the cross-sectional shape of the wave generator may have a substantially elliptical shape and an arc-shaped portion forming an arc shape with a single radius of curvature r1 over the entire region where the external gear 22 and the internal gear 24 mesh with each other through a major axis of the cross-sectional shape. Here, the major axis refers to a straight line along a position where a distance from a center of rotation of the wave generator to a peripheral surface of the wave generator is the longest in the cross section perpendicular to the axial direction. In this case, a momentary center (external gear center $O_1$) of relative motion between one external tooth of the external gear 22 meshing with the internal gear 24 (external tooth meshing with the arc-shaped portion of the wave generator) and the arc-shaped portion of the wave generator is a fixed point in the reference coordinate system corresponding to the external tooth.

In addition, in the case of the bending meshing type gear device or the like, there is a case where a tooth trace of the external gear 22 is inclined with respect to the axial direction so as to be shifted radially toward the axial direction. In this case, the above-described first and third conditions may be satisfied in the cross section perpendicular to the axial direction passing through any axial position where the external gear and the internal gear mesh with each other.

Next, a modification form of each component described so far will be described.

The type of the gear device is not particularly limited. For example, the gear device 10 may be a simple planetary gear device or a bending meshing type gear device in addition to the eccentric oscillating gear device. In the case of the eccentric oscillating gear device, a specific type thereof is not particularly limited. As in the present embodiment, this type may be, as well as a center crank type in which the crankshaft 26 is disposed on a center of the internal gear 24, a distributed type in which a plurality of crankshafts are disposed at positions radially offset from an axial center of the internal gear 24. In addition, in the case of the eccentric oscillating gear device, in addition to the case where the external gear oscillates, the internal gear may oscillate. In the case of the bending meshing type gear device, a specific type thereof is not particularly limited. For example, the type of the bending meshing type gear device may be a tubular type including two internal gears, a cup type including one internal gear, or a silk hat type. In addition, the gear device may function as any of a reduction gear, a speed up gear, and a power transmission device (power distribution device).

In a case where the gear device 10 is a bending meshing type gear device, one of the external gear 22 and the internal gear 24 is the above-mentioned flexible gear that flexibly deforms with the progress of meshing, and the other is a rigid gear having rigidity that does not undergo flexible deformation. In this case, a tooth tip circle (one of the external tooth tip circle C22 and the internal tooth tip circle C24) of the gear serving as the flexible gear may have an elliptical shape.

A specific example of the contact point locus Lc is not particularly limited. In addition, the contact point locus Lc may be formed of a curve having a center of curvature outside the external tooth tip circle C22.

The above-described embodiment and modification forms are examples. The technical idea that abstracts these should not be construed as being limited to the contents of the embodiment and the modification forms. The contents of the embodiment and the modification forms can be subjected to many design changes such as changes, additions, and deletions of components. In the above-described embodiment, the contents that can be subjected to such design changes are emphasized by adding the notation "embodiment". However, design changes of contents without such notation are also permitted. Hatched sections in the drawings do not limit the materials of the hatched objects. As a matter of course, the structures and numerical values referred to in the embodiment and modification forms include those that can be regarded as the same in consideration of manufacturing errors and the like.

It should be understood that the invention is not limited to the above-described embodiment, but may be modified into various forms on the basis of the spirit of the invention. Additionally, the modifications are included in the scope of the invention.

What is claimed is:

1. An internal meshing gear device comprising:
    an internal gear; and
        an external gear that meshes with the internal gear,
        wherein, when a straight line passing through an external gear center of the external gear and an internal gear center of the internal gear as viewed in an axial direction of the internal gear is defined as a gear center line,
        a pitch point between the external gear and the internal gear is positioned radially inside an external tooth tip circle of the external gear and an internal tooth tip circle of the internal gear,
        an intersection point between a normal line to a contact point locus between the external gear and the internal gear and the gear center line is positioned between the pitch point and the external gear center, and
        the contact point locus is formed of one or both of a curve and a straight line positioned in a meshing region between the external tooth tip circle and the internal tooth tip circle, and is positioned within an angle range in which an angle centered on the pitch point from the gear center line is 0 to $\pi/2$ [rad].
2. The internal meshing gear device according to claim 1, wherein the internal meshing gear device is an eccentric oscillating gear device including an eccentric body that oscillates the external gear.

* * * * *